(12) United States Patent
Attard et al.

(10) Patent No.: US 9,517,771 B2
(45) Date of Patent: Dec. 13, 2016

(54) AUTONOMOUS VEHICLE MODES

(71) Applicant: Ford Global Technologies, LLC, Dearborn, MI (US)

(72) Inventors: Christopher Attard, Ann Arbor, MI (US); Shane Elwart, Ypsilanti, MI (US); Jeff Allen Greenberg, Ann Arbor, MI (US); Rajit Johri, Ann Arbor, MI (US); John P. Joyce, West Bloomfield, MI (US); Devinder Singh Kochhar, Ann Arbor, MI (US); Douglas Scott Rhode, Farmington Hills, MI (US); John Shutko, Ann Arbor, MI (US); Louis Tijerina, Dearborn, MI (US); Eric Hongtei Tseng, Canton, MI (US); Wilford Trent Yopp, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 107 days.

(21) Appl. No.: 14/087,288

(22) Filed: Nov. 22, 2013

(65) Prior Publication Data

US 2015/0149017 A1    May 28, 2015

(51) Int. Cl.
*B60W 30/182* (2012.01)
*B60W 50/00* (2006.01)

(52) U.S. Cl.
CPC .... *B60W 30/182* (2013.01); *B60W 2050/0089* (2013.01); *B60W 2540/28* (2013.01)

(58) Field of Classification Search
CPC .... B60W 40/09; B60W 30/182; B60W 50/08; B60W 2540/28; B60W 2050/0089; G01C 21/00; G01C 21/26; G01C 21/34; G01C 21/36; G01C 21/3647; G01C 21/3691
USPC ............... 701/23, 67, 93, 99, 100–105
See application file for complete search history.

(56) References Cited

U.S. PATENT DOCUMENTS

| | | | |
|---|---|---|---|
| 8,457,827 B1 | 6/2013 | Ferguson et al. | |
| 2009/0306866 A1 | 12/2009 | Malikopoulos | |
| 2010/0087987 A1 | 4/2010 | Huang et al. | |
| 2012/0083960 A1* | 4/2012 | Zhu et al. | 701/23 |
| 2012/0271500 A1 | 10/2012 | Tsimhoni et al. | |
| 2013/0166100 A1* | 6/2013 | Gordh | B60W 30/182 701/1 |
| 2013/0218427 A1* | 8/2013 | Mukhopadhyay et al. | 701/51 |
| 2014/0156133 A1* | 6/2014 | Cullinane et al. | 701/23 |
| 2015/0298697 A1* | 10/2015 | Kelly | B60W 30/182 701/37 |

FOREIGN PATENT DOCUMENTS

EP    1302356 B1    8/2006

OTHER PUBLICATIONS

Kraus et al., "Optimisation-based Identification of Situation Determined Cost Functions for the Implementation of a Human-like Driving Style in an Autonomous Car", AVEC 10, 6 pages.

* cited by examiner

*Primary Examiner* — Nga X Nguyen
(74) *Attorney, Agent, or Firm* — Frank MacKenzie; Bejin Bieneman PLC

(57) ABSTRACT

A vehicle operator is identified. Based at least in part on the operator's identity, one or more parameters are determined specifying a mode for autonomously operating the vehicle. The vehicle is autonomously operated at least in part according to the one or more parameters.

17 Claims, 2 Drawing Sheets

AUTONOMOUS VEHICLE MODES

BACKGROUND

Different vehicle operators may prefer and/or be comfortable with different styles, patterns, etc., of operating a vehicle such as an automobile, truck, watercraft, etc. Various styles, patterns, etc. may provide varying degrees of comfort, enjoyment, etc., to operators and/or occupants of autonomous vehicles. Autonomous vehicles according to current designs generally operate according to instructions that do not take into account factors such as an operator's identity, and/or an operator identity in combination with factors such as weather, time of day, etc. Autonomous vehicles further are lacking with respect to operator-selectable settings to provide various patterns of driving that might be desired or warranted based on a current situation.

DRAWINGS

DESCRIPTION

Introduction

Figure 1:
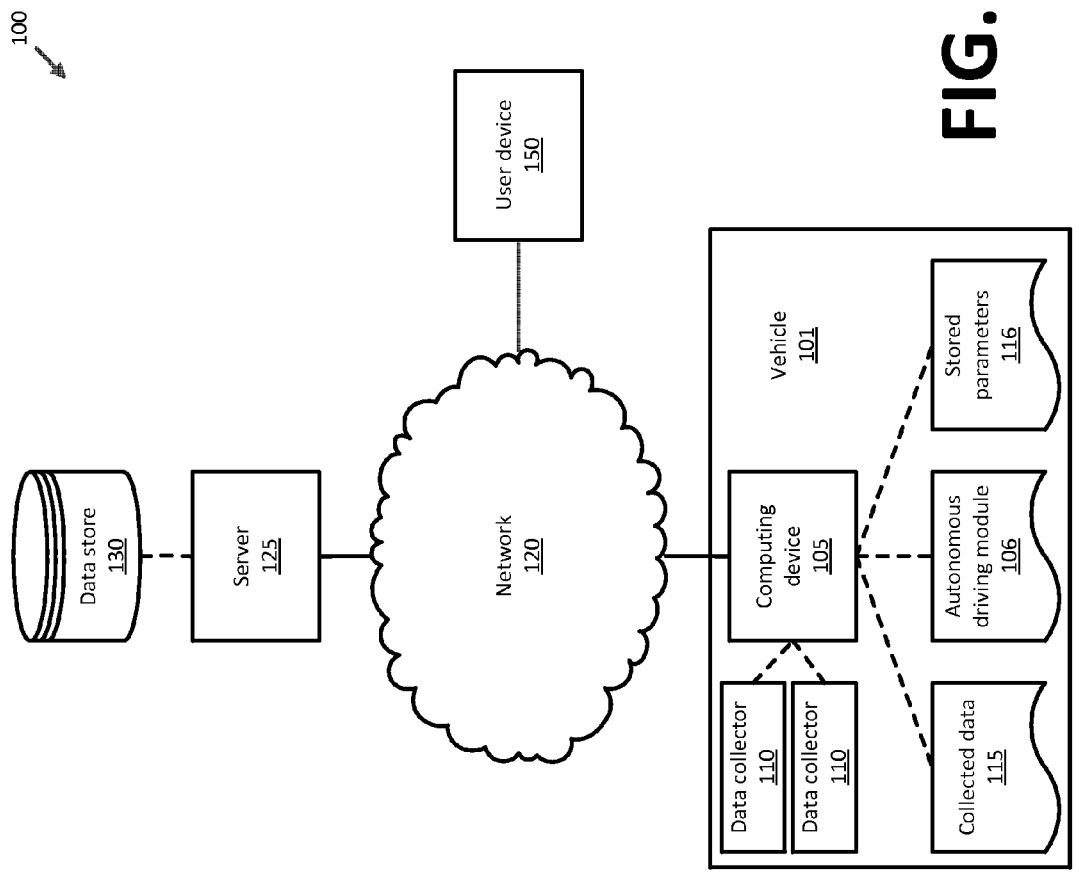
FIG. 1 is a block diagram of an exemplary vehicle system for providing and/or managing various modes of operation of an autonomous vehicle.

FIG. 1 is a block diagram of an exemplary vehicle system 100 for providing and/or managing various modes of operation of an autonomous vehicle 101. A computing device 105 in the vehicle 101 generally receives collected data 115 from one or more data collectors e.g., sensors, 110. The vehicle 101 further includes an autonomous driving module 106, e.g., as a set of instructions stored in a memory of, and executable by a processor of, the computing device 105. The vehicle computer 105 is generally configured to evaluate and synchronize operator input, collected data 115, and/or one or more stored parameters 116 to select a mode of operating the vehicle 101 and/or to determine whether to make a change or adjustment to a mode of operating the vehicle 101.

For example, different modes of operating the autonomous vehicle 101 may include a sport mode, a standard mode, and a comfort mode. Thus, a vehicle 101 operator may experience autonomous operation of the vehicle 101 in a manner similar to the operator's preferred driving style, e.g., if the operator prefers to change lanes whenever a lane change is likely to allow an increase of vehicle speed, a mode of the autonomous vehicle 101 may be configured for such behavior. Likewise, if a vehicle 101 operator prefers to remain in a non-passing lane of interstate highway whenever possible, a mode of the autonomous vehicle 101 may be configured to enter a passing lane of a highway only when confronted with an obstacle, when necessary to maintain vehicle 101 speed below a non-threshold, etc.

Further, a same vehicle 101 operator may prefer different driving styles or patterns depending on the current situation, e.g., a Rush mode: "I'm already 5 minutes late to my meeting in a half-hour and need to pick up the pace;" a Running-on-empty mode: "Conserve gasoline or you may run out before reaching the gas station;" Sightseeing mode: "Show visiting in-laws the sights driving slowly;" Cautious mode: "Drive on the interstate during an ice storm," etc. Other examples of autonomous vehicle 101 modes, and mechanisms for selecting a vehicle 101 mode, including various attributes thereof, are provided below.

Exemplary System Elements

A vehicle 101 includes a vehicle computer 105 that generally includes a processor and a memory, the memory including one or more forms of computer-readable media, and storing instructions executable by the processor for performing various operations, including as disclosed herein. For example, the computer 105 generally includes, and is capable of executing, instructions to select an autonomous operation mode, to adjust an autonomous operation mode, to change an autonomous operation mode, etc., of the vehicle 101.

Further, the computer 105 may include more than one computing device, e.g., controllers or the like included in the vehicle 101 for monitoring and/or controlling various vehicle components, e.g., an engine control unit (ECU), transmission control unit (TCU), etc. The computer 105 is generally configured for communications on a controller area network (CAN) bus or the like. The computer 105 may also have a connection to an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 110. Alternatively or additionally, in cases where the computer 105 actually comprises multiple devices, the CAN bus or the like may be used for communications between devices represented as the computer 105 in this disclosure.

In addition, the computer 105 may be configured for communicating with the network 120, which, as described below, may include various wired and/or wireless networking technologies, e.g., cellular, Bluetooth, wired and/or wireless packet networks, etc. Further, the computer 105, e.g., in the module 106, generally includes instructions for receiving data, e.g., from one or more data collectors 110 and/or a human machine interface (HMI), such as an interactive voice response (IVR) system, a graphical user interface (GUI) including a touchscreen or the like, etc.

Generally included in instructions stored in and executed by the computer 105 is an autonomous driving module 106. Using data received in the computer 105, e.g., from data collectors 110, data included as stored parameters 116, the server 125, etc., the module 106 may control various vehicle 101 components and/or operations without a driver to operate the vehicle 101. For example, the module 106 may be used to regulate vehicle 101 speed, acceleration, deceleration, steering, distance between vehicles and/or amount of time between vehicles, lane-change minimum gap between vehicles, left-turn-across-path minimum, time-to-arrival, intersection (without signal) minimum time-to-arrival to cross the intersection, etc. Further, the module 106 may learn the desired speed, acceleration, deceleration steering, car following time headway, lane change minimum gap, turn-across path minimum time-to-arrival, etc., based on specific previously visited locations and/or traversed routes and headings as driven by a particular vehicle 101 driver, thereby providing a naturalistic feel relative to what the driver expects to experience, e.g., by providing operations at specific locations that mimic maneuvers that the driver may have performed.

Data collectors 110 may include a variety of devices. For example, various controllers in a vehicle may operate as data collectors 110 to provide collected data 115 via the CAN bus, e.g., collected data 115 relating to vehicle speed, acceleration, etc. Further, sensors or the like, global positioning system (GPS) equipment, etc., could be included in a vehicle and configured as data collectors 110 to provide data directly to the computer 105, e.g., via a wired or wireless connection. Data collectors 110 could also include sensors or the like for detecting conditions outside the vehicle 101, e.g., medium-range and long-range sensors. For example, sensor data collectors 110 could include mechanisms such as RADAR, LADAR, sonar, cameras or other image capture devices, that could be deployed to measure a distance between the vehicle 101 and other vehicles or objects, to detect other vehicles or objects, and/or to detect road conditions, such as curves, potholes, dips, bumps, changes in grade, etc.

A data collector 110 may further include biometric sensors 110 and/or other devices that may be used for identifying an operator of a vehicle 101. For example, a data collector 110 may be a fingerprint sensor, a retina scanner, or other sensor 110 providing biometric data 105 that may be used to identify a vehicle 101 operator. Alternatively or additionally, a data collector 110 may include a portable hardware device, e.g., including a processor and a memory storing firmware executable by the processor, for identifying a vehicle 101 operator. For example, such portable hardware device could include an ability to wirelessly communicate, e.g., using Bluetooth or the like, with the computer 105 to identify a vehicle 101 operator.

A memory of the computer 105 generally stores collected data 115. Collected data 115 may include a variety of data collected in a vehicle 101 from data collectors 110. Examples of collected data 115 are provided above, and moreover, data 115 may additionally include data calculated therefrom in the computer 105. In general, collected data 115 may include any data that may be gathered by a collection device 110 and/or computed from such data. Accordingly, collected data 115 could include a variety of data 115 related to vehicle 101 operations and/or performance, as well as data related to in particular relating to motion of the vehicle 101. For example, collected data 115 could include data concerning a vehicle 101 speed, acceleration, braking, lane changes and or lane usage (e.g., on particular roads and/or types of roads such as interstate highways), average distances from other vehicles at respective speeds or ranges of speeds, and/or other data 115 relating to a vehicle 101 operator's historical and/or preferred driving style.

A memory of the computer 105 may further store one or more parameters 116 for determining one or more modes of autonomously operating the vehicle 101. A parameter 116 generally may be based on collected data 115, and may be used to determine an autonomous vehicle 101 mode or modes according to one or more values in collected data 115. Various categories of autonomous modes are possible at a global level, e.g., affecting a plurality of sub-modes in the vehicle 101, and/or at a more granular, e.g., sub-mode level. For example, parameters 116 could be used for globally specifying different modes of operating the autonomous vehicle 101 including a sport mode, a standard mode, and a comfort mode. In a sport mode according to this example, the vehicle 101 may operate at or within a limit in excess of posted speed limits, perhaps based on surrounding traffic patterns; change lanes whenever desirable to maintain or increase vehicle 101 speed. Further, parameters 116 could be used for specifying sub-modes, i.e., particular attributes of vehicle 101 operation.

Advantageously, parameters 116 may be used to promote not only vehicle 101 operator comfort and safety, but also to benefit other vehicles, e.g., by promoting better traffic flow. For example, where a vehicle 101 operator is comfortable with a more aggressive driving style, e.g., frequent lane changes, closer following distances, etc., then parameters 116 can be set accordingly, e.g., to a "sport" mode. Allowing for such a more aggressive driving style may allow the vehicle 101 to move more efficiently in traffic, and prevent the vehicle 101 from hindering, and in fact allow the vehicle 101 to enhance, traffic flow.

A few examples of parameters 116 are provided in Table 1 below.

TABLE 1

| Parameter | Possible Parameter Attribute Settings |
|---|---|
| Global | Sport (e.g., parameters 116 for sub-modes such as those identified below could be set to "sport") |
| Global | Moderate (e.g., parameters 116 for sub-modes such as those identified below could be set to "moderate") |
| Global | Comfort (or conservative) (e.g., parameters 116 for sub-modes such as those identified below could be set to "conservative") |
| Lane Changes | Sport - change lanes whenever will increase vehicle speed at or within 10 mph of posted speed limit |
| Lane Changes | Moderate - change lanes to increase vehicle speed but never in excess of posted speed limit |
| Lane Changes | Conservative - change lanes only to avoid obstacles, speed in below predetermined threshold, and speed in next lane is faster by a predetermined amount |
| Acceleration | Sport - accelerate as rapidly as possible remaining within accepted limits of occupant safety and vehicle 101 powertrain operation |
| Acceleration | Moderate - accelerate at a moderate rate |
| Acceleration | Conservative - accelerate at a slow rate |
| Speed | Sport - operate the vehicle 101 at or within 5 mph above posted speed limits |
| Speed | Moderate - operate the vehicle 101 at or below posted speed limits |
| Speed | Conservative - operate the vehicle 101 at least 5 mph below posted speed limits |
| Following distance | Minimum - operate the vehicle 101 at a minimum safe following distance from other vehicles depending on the vehicle 101 speed |
| Following distance | Medium - operate the vehicle 101 at a minimum safe following distance plus a specified extra margin from other vehicles depending on the vehicle 101 speed |
| Following distance | Maximum - operate the vehicle 101 at a minimum safe following distance plus a specified extra margin (greater than the medium margin from other vehicles depending on the vehicle 101 speed |
| Turn clearance | Minimum - provide a minimum distance from othe rvehicles when turning in an intersection (could be different parameters 116 for left and right turns) |
| Turn clearance | Medium - provide a medium distance from other vehicles when turning in an intersection (could be different parameters 116 for left and right turns) |
| Turn clearance | Maximum - provide a maximum distance from other vehicles when turning in an intersection (could be different parameters 116 for left and right turns) |

Many other examples of parameters 116, beyond the few examples listed in Table 1, are possible. For example, a parameter 116 could include a time of day, a day of year, etc. Further, a time parameter 116 could be used to determine at least in part other parameters 116. For example, an aggressive driving style may be desired during daytime hours, where as a moderate or conservative driving style may be desired during evening hours. Accordingly, collected data 115, e.g., from a clock data collector 110, could be used to invoke an appropriate time parameter 116. Likewise, collected data 115 and/or data provided from the server 125 could be used to indicate weather conditions, road conditions, traffic conditions, driving environment (e.g., city vs. highway), etc., which then could be used in determining appropriate driving styles. For example, a driver may ordinarily prefer an aggressive driving style, but during wet, snowy, etc., conditions, a conservative driving style may be warranted, and parameters 116 could be adjusted accordingly. Further for example, certain parameters 116 could be adjusted according to traffic conditions, e.g., a following distance parameter 116 may be set to allow a shorter following distance when traffic is moving slowly, a lane change parameter 116 may be set to allow for fewer lane changes when traffic is moving slowly, etc. Yet further for example, parameters 116 could be adjust for road conditions, e.g., a very bumpy road could warrant increasing following distances, allowing for greater braking distances, etc. Likewise, a driving environment could affect parameters 116; for example, following distances may be more compressed in city driving and greater in highway driving, and therefore differences in different levels of parameters 116 for following distance may be less for city driving that for highway driving.

In general, a parameter 116 may be stored in association with an identifier for a particular user or operator of the vehicle 101, i.e., parameters 116 are generally specified for particular vehicle 101 operators. As mentioned above, the computer 101 may use mechanisms, such as a signal from a hardware device identifying a vehicle 101 operator, biometric collected data 115, etc., to identify a particular vehicle 101 operator whose parameters 116 should be used.

Appropriate parameters 116 to be associated with a particular vehicle 101 operator, e.g., according to an identifier for the operator, may be determined in a variety of ways. For example, the vehicle 101 operator could use an HMI or the like to specify parameters 116 either singly or in combinations. Likewise, the vehicle 101 operator could use an interface, e.g., a webpage or the like, to specify parameters 116 to the server 125 for storage in the data store 130. Similarly, the data store 130 may associate certain selected operator preferences with a level of driving skills/experience. In addition the data store 130 may contain restrictions, or lift restrictions, related to certain parameters 116 based on traffic conditions. Such parameters 116 could then be downloaded via the network 120 to one or more vehicles 101.

Additionally or alternatively, parameters 116 could be based at least in part on operator characteristics, e.g., identified by use of biometric data collectors, an operator profile stored in the computer 105 and/or retrieved from the server 125, etc. For example, factors such as an operator's age, level of driving experience, estimated time to respond to vehicle 101 events (e.g., when the module 106 requires operator input concerning turning, braking, object avoidance, etc.), general health, comfort levels with various vehicle 101 speeds, following distances, lane changes, etc., could be taken into account. In one example, a global parameter 116 could be set to a "conservative" level for vehicle 101 operators older than a threshold age and/or for vehicle 101 operators below a threshold amount of driving experience. For all other vehicle 101 operators in this example, the global parameter 116 could default to "moderate."

Yet further additionally or alternatively, the computer 105 and/or the server 125 could determine parameters 116 based on usage of one or more vehicles 101 by an operator. For example, a computer 105 could store historical collected data 110 reflecting manual operation of the vehicle 101 by the operator. Such collected data 115, e.g., reflecting acceleration and/or braking patterns, speeds on various roads, lane change patterns, etc. could be used to generate parameters 116. Further, collected data 110 could be used to generate parameters 116 not readily ascertainable according to user input. An example of such a parameter 116 would be an operator's preferred jerk rate, i.e., a preferred rate of change of acceleration and/or deceleration. Although an operator may not know what a jerk rate is, or be able to specify a preferred jerk rate, collected data 115 could be aggregated to determine historical average jerk rates for an operator, which could then be specified in a parameter 116 for the vehicle 101 operator.

Moreover, various mathematical, statistical and/or predictive modeling techniques could be used to generate and/or adjust parameters 116. In a simple example, certain parameters 116 including a desired following distance and/or time interval for a vehicle 101 to follow other vehicles 101 at a speed of 50 miles per hour, e.g., a following-time headway of 2.0 seconds, could be specified by default. The computer 105 could be configured to adjust such parameters 116 based on an operator's manual operation of a vehicle 101. For example, if an operator generally followed other vehicles 101 at a distance of 5 meters, the operator's historical following distance (5 meters) could be averaged with the default following distance (10 meters). Further, the operator's historical following distance could be weighted according to an amount of time that the operator was measured at the following distance, such that eventually the parameter 116 governing following distance would converge from the default following distance to the operator's preferred, or historical, following distance of 5 meters.

More complex mathematical techniques are also possible, such as predictive modeling techniques that, based on driver behavior in certain situations, could be used to predict preferred parameters 116 for autonomous vehicle 101 operations. For example, the statistical distribution of manual driving speeds (or driver-selected speeds) for a given road segment might be used to tailor factory settings in a vehicle 101 for automated driving and customize the autonomous driving modes to an individual operator. For instance, the $90^{th}$ percentile of speeds that a driver drives on a given road type might define "sport" mode speed, the $75^{th}$ percentile might define "standard" mode speed, and the $50^{th}$ percentile might define "comfort" mode speed. These percentile thresholds could be globally adjusted if sensor data collectors 110 detect slippery roads, unfamiliar roads (based on GPS coordinates and prior trip data), or other to-be-determined factors. An autonomous vehicle 101 operator, through an HMI of, and according to instructions in, a computer 105, could also be able to revert to "default" factory settings or save a set of autonomous driving settings that he or she wishes to be applied for a given mode selection.

Returning to FIG. 1, the network 120 represents one or more mechanisms by which a vehicle computer 105 may communicate with a remote server 125 and/or a user device 150. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115 and/or parameters 116. For example, one or more parameters 116 for a particular user could be stored in the server 125 and retrieved by the computer 105 when the user was in a particular vehicle 101. Likewise, the server 125 could, as mentioned above, provide data to the computer 105 for use in determining parameters 116, e.g., data concerning whether conditions, road conditions, construction zones, etc.

A user device 150 may be any one of a variety of computing devices including a processor and a memory, as well as communication capabilities. For example, the user device 150 may be a portable computer, tablet computer, a smart phone, etc. that includes capabilities for wireless communications using IEEE 802.11, Bluetooth, and/or cellular communications protocols. Further, the user device 150 may use such communication capabilities to communicate via the network 120 including with a vehicle computer 105. A user device 150 could communicate with a vehicle 101 computer 105 the other mechanisms, such as a network in the vehicle 101, a known protocols such as Bluetooth, etc. Accordingly, a user device 150 may be used to carry out certain operations herein ascribed to a data collector 110, e.g., voice recognition functions, cameras, global positioning system (GPS) functions, etc., in a user device 150 could be used to provide data 115 to the computer 105. Further, a user device 150 could be used to provide a human machine interface (HMI) to the computer 105.

Exemplary Process Flows

Figure 2:
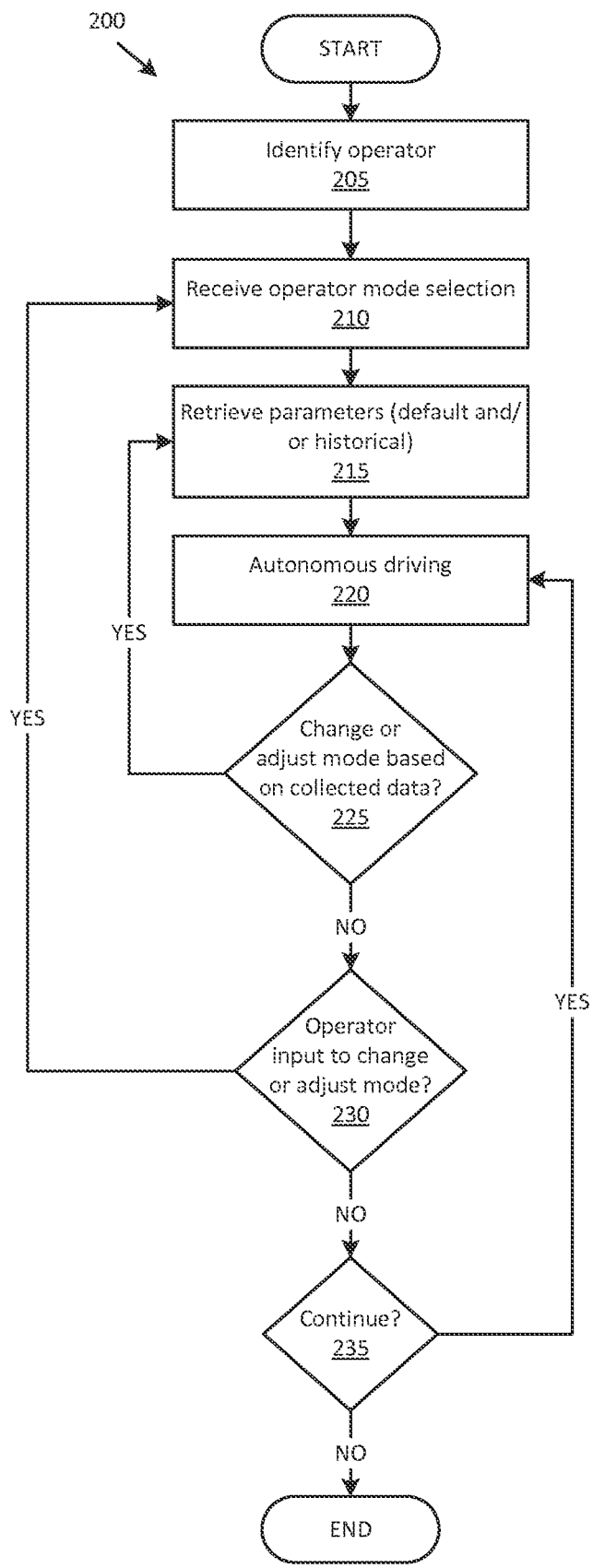
FIG. 2 is a diagram of an exemplary process for providing and/or managing various modes of operation of an autonomous vehicle.

FIG. 2 is a diagram of an exemplary process 200 for providing and/or managing various modes of operation of an autonomous vehicle 101.

The process 200 begins in a block 205, in which the computer 105 identifies a vehicle 101 operator. For example, when an operator starts the vehicle 101, approaches the vehicle 101, etc., a hardware device may provide a signal to the computer 105 identifying operator, biometric data collectors 110 could provide collected data 115 by which the computer 105 could identify the operator, etc. Further, implementations are possible in which the block 205 is omitted, i.e., an autonomous mode or modes may be selected for the vehicle 101 without identifying an operator.

Following the block 205, in a block 210, the computer 105 receives an operator selection of one or more autonomous modes. For example, an HMI such as described above could be used to receive operator input selecting an autonomous mode, e.g., aggressive, moderate, conservative, etc. Further, the HMI could be used to receive operator input concerning particular attributes, i.e., sub-modes, of autonomous vehicle 101 operation, such as preferred speeds, acceleration and/or braking patterns, lane change preferences, etc. in addition to, or as an alternative to, omitting the block 205, the block 210 could be omitted. For example, as discussed below, vehicle 101 operator selection of an autonomous mode and/or sub-modes may not be necessary or desirable because an autonomous mode and/or sub-modes may be determined from historical patterns of vehicle 101 operation.

Next, in a block 215, the computer 105 retrieves one or more parameters 116 for autonomous operation of the vehicle 101. Examples of parameters 116 are provided above in Table 1. Further, parameters 116 are generally retrieved according to the operator identifier determined as described above with respect to the block 205. That is, different vehicle 101 operators may have different preferred parameters 116, as mentioned above. Moreover, as also mentioned above, parameters 116 may be modified or adjusted for a vehicle 101 operator based on historical collected data 115 and/or various mathematical techniques. In some cases, a set of default parameters 116 may be retrieved, e.g., because an operator has not previously specified parameters 116, no historical data 115 exists and/or has been used for modifying default parameters 116, etc.

Next, in a block 220, the vehicle 101 commences autonomous driving operations using the parameters 116 retrieved as described above with respect to the block 215. Thus, the vehicle 101 is operated partially or completely autonomously, i.e., a manner partially or completely controlled by the autonomous driving module 106, and at least partially according to one or more parameters 116. For example, all vehicle 101 operations, e.g., steering, braking, speed, etc., could be controlled by the module 106 in the computer 105. It is also possible that, in the block 220, the vehicle 101 may be operated in a partially autonomous (i.e., partially manual, fashion, where some operations, e.g., braking, could be manually controlled by a driver, while other operations, e.g., including steering, could be controlled by the computer 105. Likewise, the module 106 could control when a vehicle 101 changes lanes. Further, it is possible that the process 200 could be commenced at some point after vehicle 101 driving operations begin, e.g., when manually initiated by a vehicle occupant through a user interface of the computer 105.

Following the block 220, in a block 225, the computer 105 determines whether to change or adjust an autonomous driving mode, i.e., whether to change or adjust one or more parameters 116. For example, as noted above, parameters 116 may vary according to a time of day, weather conditions, a type of road (e.g., gravel, paved, interstate, city street, etc.), etc. Accordingly, parameters 116 may be changed or adjusted based on collected data 115 and/or data provided from the server 125.

If it is determined in the block 225 that parameters 116 should be adjusted or changed, i.e., because of new data such as new collected data 115, then the process 200 returns to the block 215. Otherwise, a block 230 is executed next.

In the block 230, the computer 105 determines whether operator input has been received to change or adjust one or more autonomous modes. For example, an operator could provide input to change a mode from aggressive to conservative, etc. Further for example, an operator could provide input to change a sub-mode or attribute, e.g., the operator could provide input to an HMI of the computer 105 by turning a knob, setting a control on a touchscreen, providing a voice command, etc., concerning an autonomous driving sub-mode such as following distance. For example, the operator could specify for the vehicle 101 to increase its following distance at 50 miles per hour by two meters. In any event, if input is received to change or adjust an autonomous driving mode or modes, then the process 200 returns to the block 210. Otherwise, the process 200 proceeds to the block 235.

In the block 235, the computer 105 determines whether the process 200 should continue. For example, the process 200 may end if autonomous driving operations end and a driver resumes manual control, if the vehicle 101 is powered off, etc. In any case, if the process 200 should not continue, the process 200 ends following the block 235. Otherwise, the process 200 returns to the block 210. The process 200 may also end if there is a change in vehicle 101 operators. In this case a current process 200 could end and new process 200 could be initiated for the new vehicle 101 operator, e.g., starting in the block 205.

Conclusion

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer in a vehicle, the computer comprising a processor and a memory, wherein the computer is programmed to:
    identify an operator of the vehicle;
    determine, based at least in part on the operator's identity, a plurality of parameters, wherein each parameter provides a rule for a respective vehicle operation that includes at least one of controlling vehicle speed and controlling vehicle steering;
    use the parameters to select one of at least three possible modes of autonomously operating the vehicle; and
    autonomously operate the vehicle by controlling each of vehicle speed, vehicle acceleration, vehicle deceleration, vehicle braking, at least one of a vehicle distance and a vehicle time to other vehicles, vehicle steering, and also one or more of lane change minimum gap between vehicles, left turn across path minimum, time to arrival at intersection, and turn clearance, the autonomous operation being performed at least in part according to the selected mode, wherein the selected mode sets a value for each of the parameters.

2. The system of claim 1, wherein at least one of the parameters is based on data collected during vehicle operations.

3. The system of claim 1, wherein at least one of the parameters is based on data received from a remote server.

4. The system of claim 1, wherein at least one of the parameters is generated according to a weather condition, a type of road, a time of day, and a day of year.

5. The system of claim 1, wherein the computer is further configured to:
    collect data during vehicle operations;
    calculate one or more second parameters based at least in part on the collected data; and
    autonomously operate the vehicle at least in part according to the one or more second parameters.

6. The system of claim 1, wherein at least one of the one or more second parameters is determined by retrieving the at least one second parameter from a remote server.

7. A method, comprising:
    identifying an operator of the vehicle;
    determining, based at least in part on the operator's identity, a plurality of parameters, wherein each parameter provides a rule for a respective vehicle operation that includes at least one of controlling vehicle speed and controlling vehicle steering;
    using the parameters to select one of at least three possible modes of autonomously operating the vehicle; and
    autonomously operating the vehicle by controlling each of vehicle speed, vehicle acceleration, vehicle deceleration, vehicle braking, at least one of a vehicle distance and a vehicle time to other vehicles, vehicle steering, and also one or more of lane change minimum gap between vehicles, left turn across path minimum, time to arrival at intersection, and turn clearance, the autonomous operation being performed at least in part according to the selected mode, wherein the selected mode sets a value for each of the parameters.

8. The method of claim 7, wherein at least one of the parameters is based on data collected during vehicle operations.

9. The method of claim 7, wherein at least one of the parameters is based on data received from a remote server.

10. The method of claim 7, wherein at least one of the parameters is generated according to a weather condition, a type of road, a time of day, and a day of year.

11. The method of claim 7, further comprising:
collecting data during vehicle operations;
calculating one or more second parameters based at least in part on the collected data; and
autonomously operating the vehicle at least in part according to the one or more second parameters.

12. The method of claim 7, wherein at least one of the one or more second parameters is determined by retrieving the at least one second parameter from a remote server.

13. A non-transitory computer-readable medium tangibly embodying computer-executable instructions, the instructions including instructions to:
identify an operator of the vehicle;
determine, based at least in part on the operator's identity, a plurality of parameters, wherein each parameter provides a rule for a respective vehicle operation that includes at least one of controlling vehicle speed and controlling vehicle steering;
use the parameters to select one of at least three possible modes of autonomously operating the vehicle; and
autonomously operate the vehicle by controlling each of vehicle speed, vehicle acceleration, vehicle deceleration, vehicle braking, at least one of a vehicle distance and a vehicle time to other vehicles, vehicle steering, and also one or more of lane change minimum gap between vehicles, left turn across path minimum, time to arrival at intersection, and turn clearance, the autonomous operation being performed at least in part according to the selected mode, wherein the selected mode sets a value for each of the parameters.

14. The medium of claim 13, wherein at least one of the parameters is based on at least one of data collected during vehicle operations and data received from a remote server.

15. The medium of claim 14, wherein at least one of the parameters is generated according to a weather condition, a type of road, a time of day, and a day of year.

16. The medium of claim 14, wherein the instructions further include instructions to:
collect data during vehicle operations;
calculate one or more second parameters based at least in part on the collected data; and
autonomously operate the vehicle at least in part according to the one or more second parameters.

17. The medium of claim 13, wherein at least one of the one or more second parameters is determined by retrieving the at least one second parameter from a remote server.

* * * * *